United States Patent [19]

Umeda

[11] Patent Number: 5,375,218
[45] Date of Patent: Dec. 20, 1994

[54] DMA CHANNEL CONTROL APPARATUS CAPABLE OF ASSIGNING INDEPENDENT DMA TRANSFER CONTROL LINE TO RESPECTIVE EXPANSION SLOTS

[75] Inventor: Akira Umeda, Chigasaki, Japan

[73] Assignee: Kabushiki Kaisha Toshiba, Kawasaki, Japan

[21] Appl. No.: 941,309

[22] Filed: Sep. 4, 1992

[30] Foreign Application Priority Data

Sep. 6, 1991 [JP] Japan .................. 3-227429

[51] Int. Cl.$^5$ .............................. G06F 13/28
[52] U.S. Cl. ......................... 395/425; 395/325; 364/242.3; 364/242.33; 364/241.9; 364/DIG. 1
[58] Field of Search ............. 395/325, 275, 425, 800; 340/825.03

[56] References Cited

U.S. PATENT DOCUMENTS

| | | | |
|---|---|---|---|
| 4,514,808 | 4/1985 | Murayama et al. | 395/425 |
| 4,545,014 | 10/1985 | Oguchi | 395/425 |
| 4,891,752 | 1/1990 | Fairman et al. | 395/425 |
| 5,031,097 | 7/1991 | Kitakami et al. | 395/425 |
| 5,109,517 | 4/1992 | Houda et al. | 395/800 |
| 5,182,800 | 1/1993 | Farrell et al. | 395/425 |
| 5,208,915 | 5/1993 | Stadlmeier | 395/325 |
| 5,212,795 | 5/1993 | Hendry | 395/725 |
| 5,257,387 | 10/1993 | Richek et al. | 395/800 |
| 5,269,005 | 12/1993 | Heil et al. | 395/275 |

*Primary Examiner*—Gopal C. Ray
*Attorney, Agent, or Firm*—Finnegan, Henderson, Farabor, Garrett & Dunner

[57] ABSTRACT

A CPU interprets and executes a command in accordance with a program. A DMA channel selector is controlled by the CPU. The DMA channel selector determines whether a DMA transfer control signal from each of the independent DMA transfer control lines of a plurality of expansion slots is a common DMA transfer control signal or an independent DMA transfer control signal for each slot, thus connecting each of the independent DMA transfer control lines to a first or second DMAC. With this operation, an independent DMA transfer control line is assigned to each expansion slot while the compatibility with each expansion slot of an existing apparatus is maintained.

4 Claims, 8 Drawing Sheets

DMA CHANNEL CONTROL APPARATUS CAPABLE OF ASSIGNING INDEPENDENT DMA TRANSFER CONTROL LINE TO RESPECTIVE EXPANSION SLOTS

BACKGROUND OF THE INVENTION

1. Field of the Invention

The present invention relates to a direct memory access (DMA) channel control apparatus which can assign independent DMA transfer control lines in units of expansion slots while maintaining the compatibility of the expansion slots with the existing information processing apparatuses.

2. Description of the Related Art

In conventional information processing apparatuses and the like, an expansion card is used as one of expansion means for the expansion of the function or the like. An expansion card is inserted in an expansion slot serving as a connector in a conventional control apparatus. All the expansion slots are connected such that pins of the same numbers are connected in parallel to each other by various signal lines. The expansion slots are also connected in parallel with a direct memory access controller (DMAC). DMA transfer control lines are also connected between the expansion slots in parallel. A CPU sends status and address signals, respectively serving to generate timing and address signals, to a decoder. The decoder generates required signals, i.e., an I/O write command (IOWCO), an I/O read command (IORCO), and a chip select signal (CSO). Each command is supplied to the main body of the apparatus together with external data to be interpreted, thus executing a predetermined expanded function. In this conventional apparatus, the same result can be obtained whichever slot the expansion card is inserted into.

Conventionally, in order to maintain the compatibility with an expansion card used for the existing information processing apparatuses and the like, signal lines for the respective pins of the slots cannot be changed, and the number of signal lines is limited. Therefore, if the required number of expansion slots is large, the number of DMA transfer control lines is smaller than that of the expansion slots. Even in a case wherein the number of expansion slots is small, if the DMA transfer control lines in the main body of the apparatus are also used as the DMA transfer control lines of the expansion slots, the number of DMA transfer control lines which can be actually used for the expansion slots is reduced. For this reason, if independent DMA transfer control lines are to be assigned to the respective expansion cards, i.e., the respective expansion slots, a shortage of DMA transfer control lines occurs. In contrast to this, if DMA transfer control lines are independently connected in units of expansion slots, the compatibility of software for processing the contents of an expansion card in the existing apparatus is lost since the specifications of a DMA transfer control line for each expansion slot are different from those of a corresponding expansion slot of an existing apparatus.

SUMMARY OF THE INVENTION

It is, therefore, an object of the present invention to provide a DMA channel control apparatus which can assign independent DMA transfer control lines to the respective expansion slots while maintaining the compatibility with the expansion slots of the existing apparatuses.

In order to achieve the above object, according to the present invention, there is provided a DMA channel control apparatus comprising a plurality of common DMA transfer means commonly connected to a plurality of expansion slots, DMA transfer control means independently connected to each of the expansion slots, a CPU for controlling the overall apparatus and outputting commands to control DMA transfer, and control means, connected to the plurality of common DMA transfer means and the DMA transfer means independently connected to each of the expansion slots, for determining common DMA transfer or independent DMA transfer for each of the expansion slots on the basis of a command from the CPU, thereby performing DMA transfer.

A CPU interprets and executes a command in accordance with a program. A DMA channel selector is controlled by the CPU. The DMA channel selector determines whether a DMA transfer control signal from each of the independent DMA transfer control lines of a plurality of expansion slots is a common DMA transfer control signal or an independent DMA transfer control signal for each slot, thus connecting each of the independent DMA transfer control lines to a first or second DMAC.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

A DMA channel control apparatus according to an embodiment of the present invention will be described below with reference to the accompanying drawings.

Figure 1:
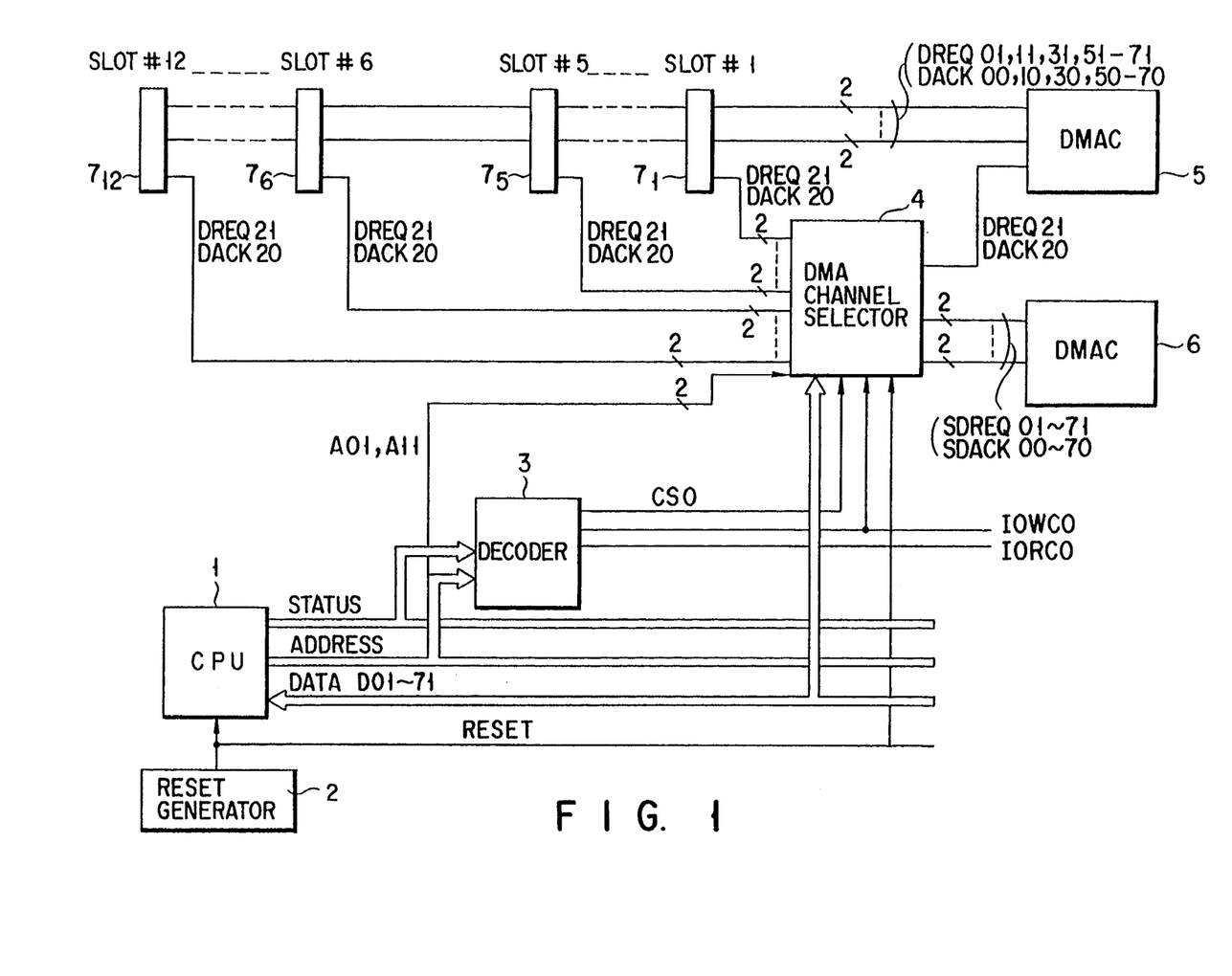
FIG. 1 is a block diagram showing a DMA channel control apparatus according to an embodiment of the present invention.

FIG. 1 is a block diagram showing the DMA channel control apparatus according to the embodiment of the present invention. The DMA channel control apparatus comprises a CPU 1, a reset generator 2, a decoder 3, a DMA channel selector (DCS) 4, a first direct memory access controller (DMAC) 5, a second direct memory access controller (DMAC) 6, and slots $7_1$ to $7_{12}$ (slots #1 to #12) serving as expansion slots. In this embodiment, eight pairs of DMA transfer control lines (to be described later), the DMA channel selector 4, and a DMAC 6 are newly added to the arrangement of the conventional apparatus. The CPU 1 performs overall control of the apparatus. The reset generator 2, the decoder 3, and other components are connected to the CPU 1. The DMA channel selector 4 selects either common DMA transfer common to all the slots $7_1$ to $7_{12}$ or independent DMA transfer of each slot. The DMA channel selector 4, the DMAC 5, and the DMAC 6 constitute a control means. The DMAC 5 is connected to the DMA channel selector 4 through control lines DREQ21 and DACK20. The DMAC 6 is connected to the DMA channel selector 4 through control lines SDREQ01 to SDREQ71 and SDACK00 to SDACK70 for slot DMA transfer. The DMA transfer control lines DREQ21 and DACK 20 assigned to specific pin numbers of the slots $7_1$ to $7_{12}$ are connected, as independent DMA transfer control lines for the respective slots, to the DMA channel selector 4. Six pairs of DMA transfer control lines DREQ01, DREQ11, DREQ31, DREQ51, DREQ61 and DREQ71, and DACK00, DACK10, DACK30, DACK50, DACK60 and DACK70 are commonly connected to all the expansion slots $7_1$ to $7_{12}$ in parallel, and are also connected to the DMAC 5 in parallel. In this embodiment, the six pairs of the control lines DREQ and DACK are commonly connected to all the slots in parallel and are smaller in number than the slots $7_1$ to $7_{12}$. However, in practice, these six pairs of control lines DREQ01 to DREQ71 are also used for DMA transfer control of, e.g., an FDC and an HDC in the main body of the apparatus. Therefore, in order to maintain the compatibility with DMA transfer control lines DREQ01 to DREQ71 of the conventional apparatus, these control lines DREQ01 to DREQ71 cannot be freely separated from both the slots $7_1$ to $7_{12}$ and the main body of the apparatus. Although an information processing apparatus requires memories, I/O units, and the like, in addition to the CPU 1, the DMAC 5, and the DMAC 6, they are omitted from FIG. 1 for the convenience of explanation.

Figure 2:
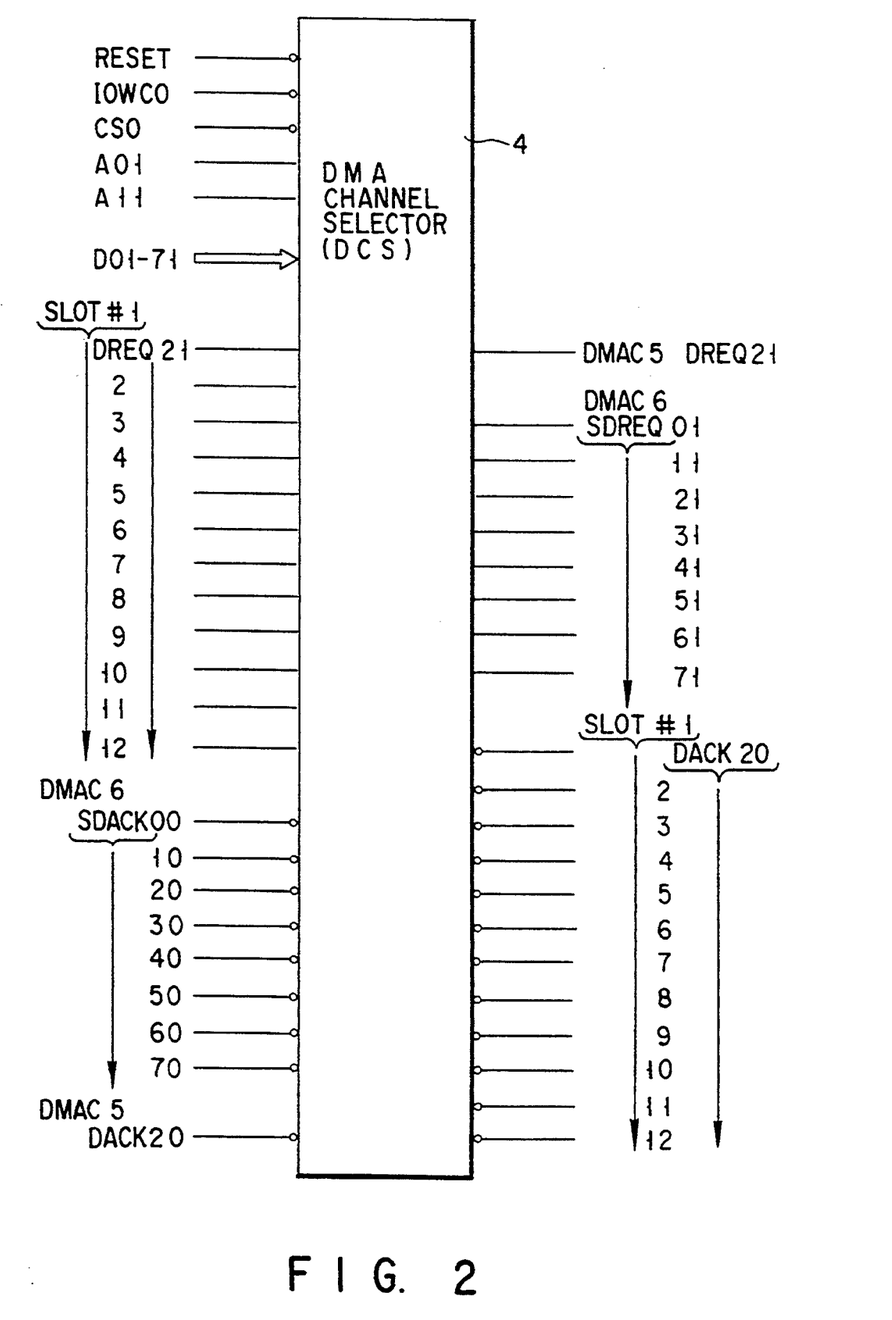
FIG. 2 is a view showing the input/output lines of a DMA channel selector in FIG. 1.

FIG. 2 is a view for explaining the input/output lines of the DMA channel selector 4 in FIG. 1 in detail. The DMA channel selector 4 includes the following input lines: a reset command line (RESET) extending from the reset generator 2; an I/O write command line (IOWCO) and a chip select line (CSO), both extending from the decoder 3; switching designation signal lines (A01 and A11) from the CPU1; data input lines (D01 to D71) connected to an external apparatus; DMA transfer control lines DREQ21 extending from the expansion slots $7_1$ to $7_{12}$; control lines SDACK00 to SDACK70 extending from the DMAC 6; and a control line DACK20 extending from the DMAC 5. In addition, the DMA channel selector 4 includes the following output lines: a control line DREQ21 extending to the DMAC 5; DMA transfer control lines SDREQ01 to SDREQ71 extending to the DMAC 6; and control lines DACK20 extending to the expansion slots $7_1$ to $7_{12}$.

Operations of the DMA channel control apparatus of the present invention will be briefly described below with reference to FIGS. 1 and 2. An operation of the apparatus in the initialization mode will be described first. In the initialization mode, a reset signal RESET is set at "1" by the reset generator 2 to set outputs Q from all registers 22a to 22d at "1". Consequently, the control lines DREQ21 of the respective slots $7_1$ to $7_{12}$ are connected to the control lines DREQ21 of the DMAC 5 through the DMA channel selector 4. The control lines DACK20 of the respective slots $7_1$ to $7_{12}$ are connected to the control lines DACK20 of the DMAC 5 through the DMA channel selector 4. As a result, the apparatus is set to calculate the logical OR of DMA transfer control signals from all the slots $7_1$ to $7_{12}$. That is, in the initialization mode, the DMA channel control apparatus of the present invention operates in the same manner as the conventional DMA channel control apparatus. Therefore, even if an expansion card is inserted in any one of the slots $7_1$ to $7_{12}$, the same DMA transfer control signal appears on the same DMA transfer control line as long as the same expansion card is inserted.

Next, a normal operation of the apparatus will be described. DMA transfer control signals from the control lines DREQ21 of the slots $7_1$ to $7_{12}$ are input to the DMA channel selector 4. As will be described in detail later, the DMA channel selector 4 determines on the basis of a command from the CPU 1 whether to calculate the logical OR of each of the DMA transfer control signals from the slots $7_1$ to $7_{12}$ and other DMA transfer control signals and input the resultant signal to the DMAC 5 or to input them as independent DMA transfer control signals to the DMAC 6. If the logical OR is to be calculated, the logical OR of other DMA transfer control signals is also calculated, thus maintaining the compatibility with software for an expansions card used for a conventional apparatus. If the signals are independent DMA transfer control signals for the respective slots $7_1$ to $7_{12}$, the DMAC 6 performs DMA transfer.

Figure 3:
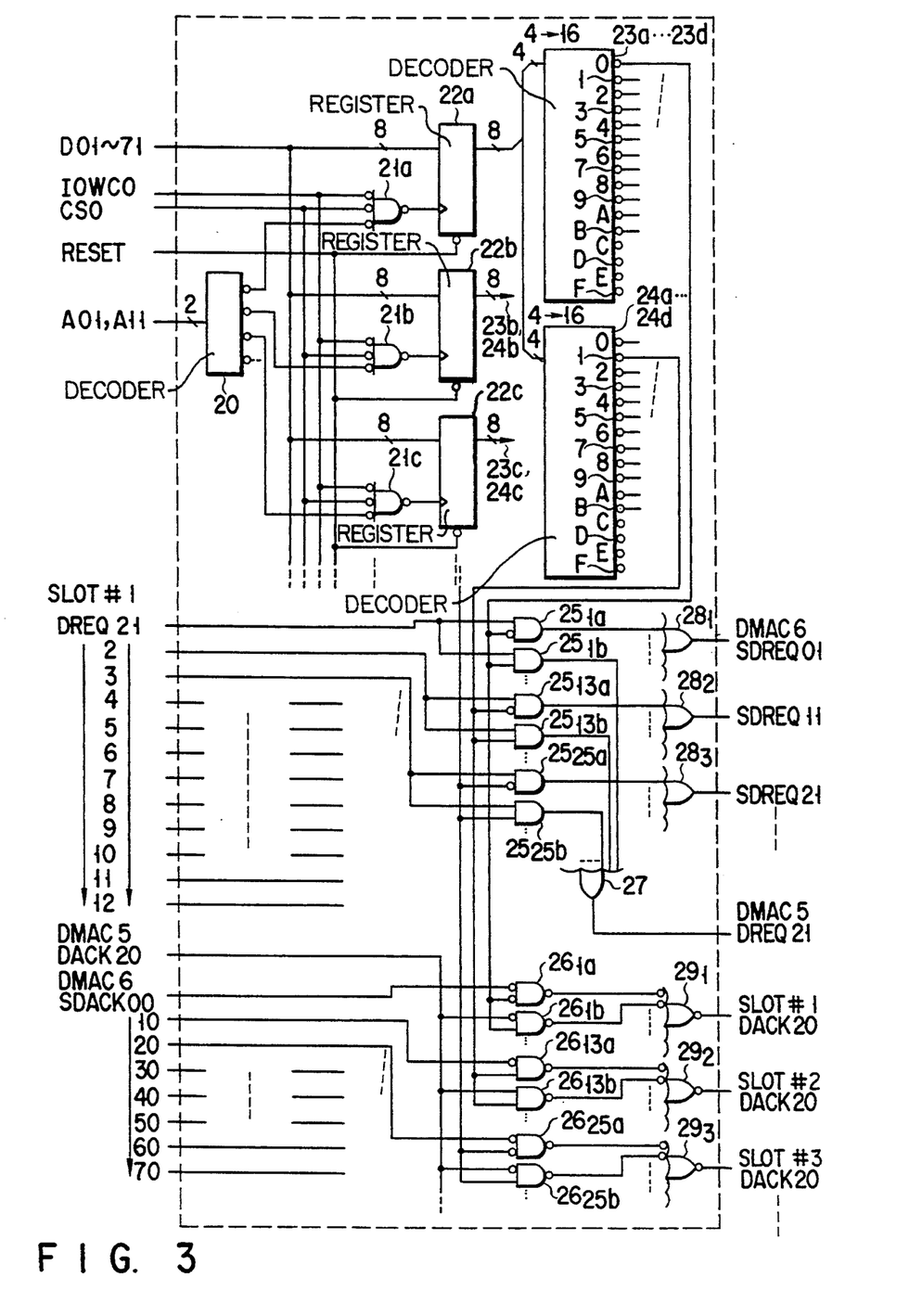
FIG. 3 is a circuit diagram showing an arrangement of part of the DMA channel selector in FIG. 1.

FIG. 3 is a circuit diagram showing the arrangement of the DMA channel selector (DCS) 4 in FIG. 1. The DMA channel selector 4 is constituted by a decoder 20, gate circuits 21a to 21d, registers 22a to 22d, decoders 23a to 23d and 24a to 24d, gate circuits (AND circuits) $25_{1a}$ to $25_{144b}$, gate circuits $26_{1a}$ to $26_{96b}$, and gate circuits (OR gates) 27, $28_1$ to $28_{12}$, and $29_1$ to $29_8$. The decoder 20 decodes switching designation signals A01 and A11 from the CPU 1 to output 4-bit signals as selection signals to the respective gate circuits 21a to 21d. In addition to the 4-bit signals from the decoder 20, the gate circuits 21a to 21d commonly receive an I/O write command (IOWCO) and a chip select signal (CSO), and output clock pulses to the registers 22a to 22d in accordance with the respective input levels. The registers 22a to 22d output 8-bit data D01 to D71 to the decoders 23a to 23d and 24a to 24d in accordance with the clock pulses from the respective gate circuits 21a to 21d. In addition, thereset signal from the CPU 1 is input to the registers 22a to 22d. Each of the four registers 22a to 22d is a 8-bit register consisting of eight D type flip-flops. The output terminals of the four registers 22a to 22d are respectively connected to the input terminals of the four decoders 23a to 23d and of the four decoders 24a to 24d. The connection of the gate circuits will be described in detail. For example, one output terminal of the decoder 20 is connected to the gate circuit 21d. The output terminal of the gate circuit 21a is connected to the register 22a, and the output terminal of the register 22a is connected to the decoders 23a and 24a. The remaining gate circuits 21b to 21d are connected to the decoders 23b to 23d and the decoders 24b to 24d in the same manner as described above. Assume that the register 22a is selected in accordance with a selection signal from the decoder 20. The upper 4 bits of 8-bit data from the register 22a are supplied to the decoder 23a, while the lower 4 bits are supplied to the decoder 24a. Each of the decoders 23a and 24a decodes the 4-bit data, supplied from the register 22a, into 16-bit data.

Figure 4:
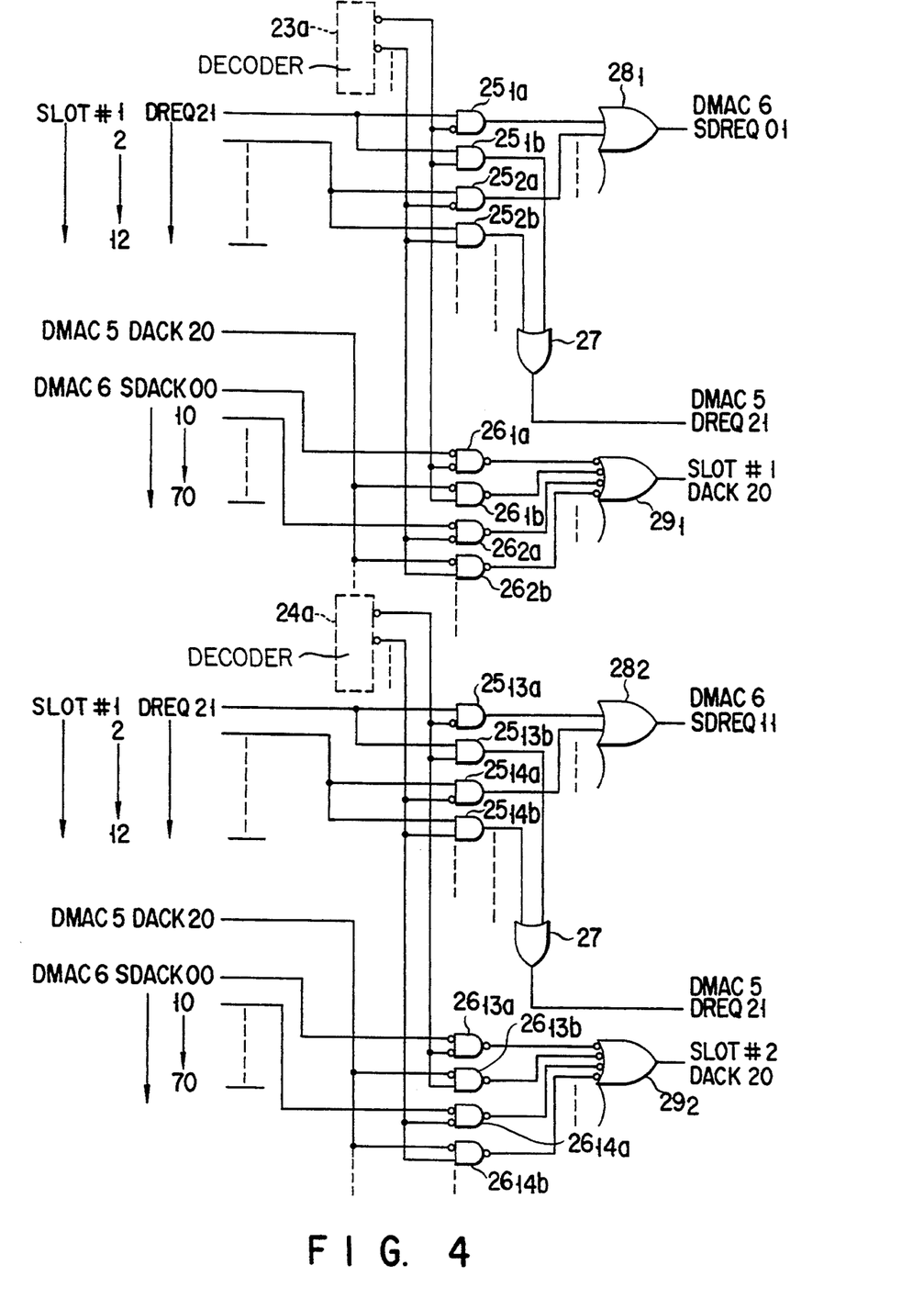
FIG. 4 is a circuit diagram for explaining the connection of gate circuits in the DMA channel selector in FIG. 3.

FIG. 4 is a circuit diagram for explaining the details of the connection of the gate circuits 25 to 29 in the DMA channel selector 4 shown in FIG. 3. Each output terminal of the decoder 23a is connected to one input terminal of each of gate circuits $25_{1a}$ to $25_{12b}$ and $26_{1a}$ to $26_{12b}$. Each of the control lines DREQ21 of the slots $7_1$ to $7_{12}$ is connected to the other input terminal of each of the gate circuits $25_{1a}$ to $25_{12b}$. The control lines SDACK00 to SDACK70 of the DMAC 6 are respectively connected to the input terminals of the odd gate circuits $26_{1a}, 26_{2a}, \ldots 26_{12a}$ of the gate circuits $26_{1a}$ to $26_{12b}$. The control line DACK20 of the DMAC 5 is connected to the even gate circuits $26_{1b}, 26_{2b}, \ldots 26_{12b}$. Each output terminal of the decoder 24a is connected to one input terminal of each of gate circuits $25_{13a}$ to $25_{24b}$ and $26_{13a}$ to $26_{24b}$. Each of the control lines DREQ21 of the slots $7_1$ to $7_{12}$ is connected to the other input terminal of each of the gate circuits $25_{13a}$ to $25_{24b}$. The control lines SDACK00 to SDACK70 of the DMAC 6 are respectively connected to the input terminals of the odd gate circuits $26_{13a}, 26_{14a}, \ldots 26_{24a}$ of the gate circuits $26_{13a}$ to $26_{24b}$. The control line DACK20 of the DMAC 5 is connected to the even gate circuits $26_{13b}, 26_{14b}, \ldots 26_{24b}$.

More specifically, as shown in FIG. 4, an output terminal 0 of the decoder 23a is connected to the gate circuits $25_{1a}, 25_{1b}$ and $26_{1a}, 26_{1b}$. An output terminal 1 of the decoder 23a is connected to the gate circuits $25_{2a}, 25_{2b}$ and $26_{2a}, 26_{2b}$. Similarly, output terminals 2 through B of the decoder 23a respectively connected to gate circuits $25_{3a}$ to $25_{12b}$ and $26_{3a}$ to $26_{12b}$ (not shown). An output terminal 0 of the decoder 24a is connected to the gate circuits $25_{13a}, 25_{13b}$ and $26_{13a}, 26_{13b}$. An output terminal 1 of the decoder 24a is connected to the gate Circuits $25_{14a}, 25_{14b}$ and $26_{14a}, 26_{14b}$. Similarly, output terminals 2 through B of the decoder 24a respectively connected to gate circuits $25_{15a}$ to $25_{24b}$ and $26_{15a}$ to $26_{24b}$ (not shown). The remaining decoders 23b to 23d and 24b to 24d (not shown) are connected to gate circuits $25_{25a}$ to $25_{144b}$ and $26_{25a}$ to $26_{96b}$ in the same manner as described above.

As shown in FIG. 4, the input terminals of the gate circuit $28_1$ are connected to the output terminals of the odd gate circuits $25_{1a}, 25_{2a}, \ldots, 25_{12a}$ of the gate circuits $25_{1a}$ to $25_{12b}$ (not shown) connected to the output terminals of the decoder 23a. The input terminals of the gate circuit 27 are connected to the output terminals of the even gate circuits $25_{1b}, 25_{2b}, \ldots, 25_{12b}$. The DMAC 6 is connected to the output terminal of the gate circuit $28_1$ through the control line SDREQ01. The DMAC 5 is connected to the output terminal of the gate circuit 27 through the control line DREQ21. The gate circuits $26_{1a}$ to $26_{12b}$ (not shown) connected to the output terminals of the decoder 23a are connected to the gate circuit $29_1$. The slot $7_1$ is connected to the output terminal of the gate circuit $29_1$ through the control line DACK20. The decoder 24a and the remaining decoders 23b to 23d, 24b to 24d (not shown) are connected in the same manner as described above. Note that the abovementioned decoders 23a, 24a; 23b, 24b; 23c, 24c; and 23d, 24d are arranged in pairs to set different decoded contents, thus changing the contents to be switched by the gate circuits. The above-described gate circuits $25_{1a}$ to $25_{144b}, 26_{1a}$ to $26_{96b}, 28_1$ to $28_{12}$ and $29_1$ to $29_8$ execute a predetermined expanded function in accordance with outputs from the decoders 23a to 23d and 24a to 24d.

An operation of the DMA channel selector 4 in FIG. 3 will be described in detail below with reference to FIGS. 3 to 5D. FIGS. 5A to 5D are views showing all the functions of the DMA channel selector 4 in detail. The DMA channel selector 4 selects first on the basis of a command from the CPU 1 whether to calculate the logical OR of each of the DMA transfer control signals from the slots $7_1$ to $7_{12}$ and other DMA transfer control signals and input the resultant signal to the DMAC 5 or to input them as independent DMA transfer control signals to the DMAC 6. Assume that a command is output from the CPU 1 to calculate the logical OR of each of the DMA transfer control signals from the slots $7_1$ to $7_{12}$ and the remaining DMA transfer control signals and input it to the DMAC 5. In this case, the reset signal RESET is set at "1" by the reset generator 2 and is input to the registers 22a to 22d. All the outputs from the registers 22a to 22d are set at "1", and the resultant outputs of "1" are input to the decoders 23a to 23d and 24a to 24d. The decoded output signals from the decoders 23a to 23d and 24a to 24d are respectively input to the gate circuits $25_{1a}$ to $25_{144b}$ and $26_{1a}$ to $26_{96b}$. The control lines DREQ21 of the respective slots $7_1$ to $7_{12}$ are connected to the DMAC 5 through the even gate circuits $25_{1b}$ to $25_{144b}$, the gate circuits 27, and the control lines DREQ21 connected to the DMAC 5. The control lines DACK20 of the DMAC 5 are respectively connected to the slots $7_1$ to $7_{12}$ through the even gate circuits $26_{1b}$ to $26_{96b}$ and $29_1$ to $29_8$ and the control lines DACK20 connected to the respective slots $7_1$ to $7_{12}$.

A case wherein a DMA transfer control signal from each slot is input, as an independent DMA transfer control signal, to the DMAC 6 will be described next. As shown in FIG. 4, upon reception of the switching designation signals A11 and A01 from the CPU 1, the decoder 20 decodes the input signals A11 and A01 and outputs the decoded selection signals to the gate circuits 21a to 21d. The gate circuits 21a to 21d receive the selection signals decoded by the decoder 20, the I/O write command (IOWCO), and the chip select signal (CSO). When all the input levels are "0"s, the gate circuits 21a to 21d output clock pulses to the registers 22a to 22d. The selection signals from the decoder 20, which are obtained by decoding the switching designation signals A11 and A01, serve to select one of the four registers 22a, 22b, 22c, and 22d.

Figure 5A:
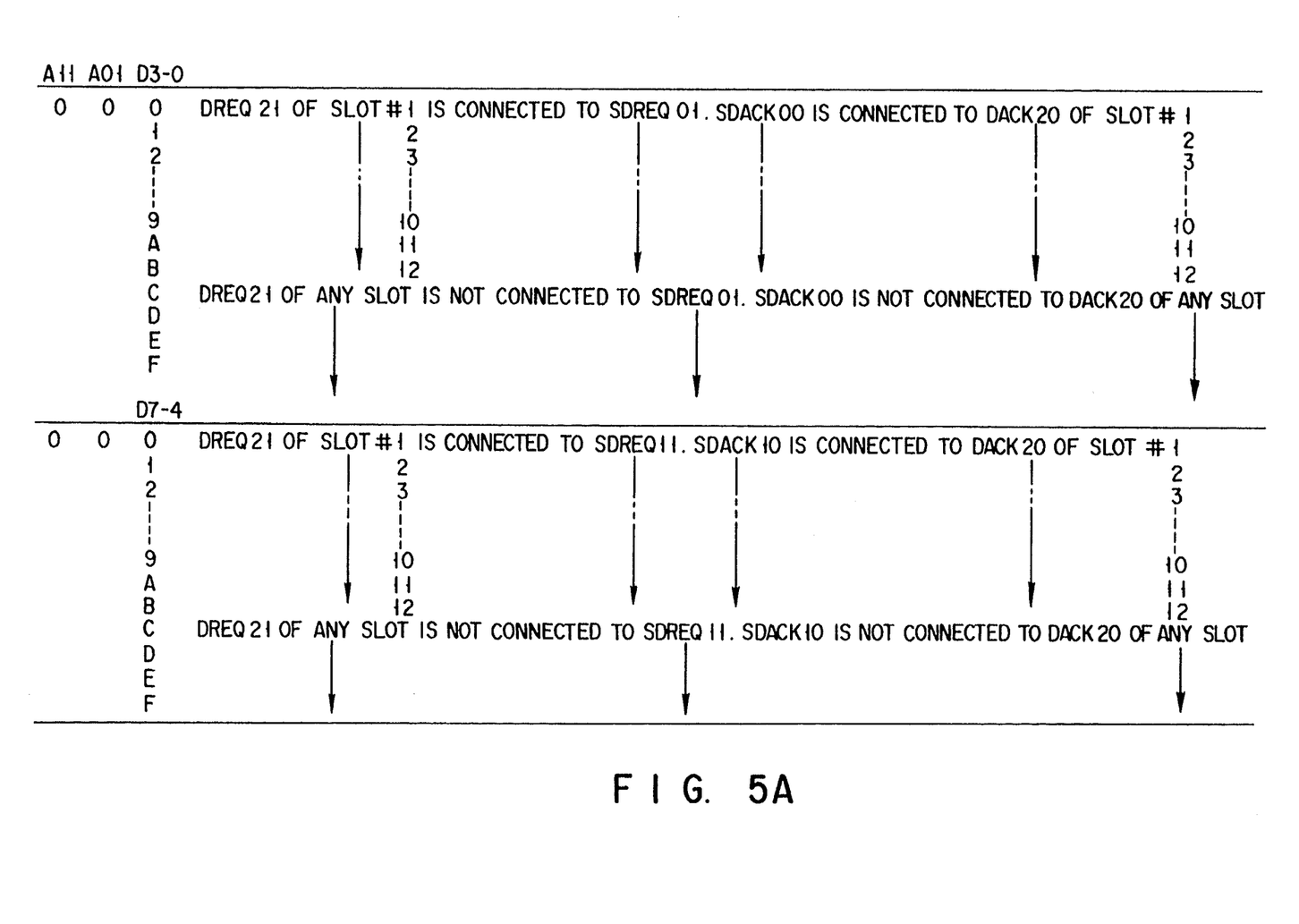
FIGS. 5A to 5D are views illustrating the function of the DMA channel selector.

Assume, as shown in FIG. 5A, that both the switching designation signals A11 and A01 are at "0". In this case, the register 22a is selected. As a result, the upper 4 bits of the 8-bit data D01 to D71 are supplied to the decoder 23a, while the lower 4 bits are supplied to the decoder 24a. As shown in FIG. 4, an output signal from the decoder 23a, based on the upper 4 bits D3 to D0, is input to the gate circuits $25_{1a}$ to $25_{12b}$ (not shown). The gate circuits $25_{1a}$ to $25_{12b}$ operate in accordance with the output signal from the decoder 23a such that the control line DREQ21 of each of the slots $7_1$ to $7_{12}$ is connected to the control line SDREQ01 of the DMAC 6 through the gate circuit $28_1$. The output signal from the decoder 23a is also input to the gate circuits $26_{1a}$ to $26_{12b}$ (not shown). The gate circuits $26_{1a}$ to $26_{12b}$ operate in accordance with the output signal from the decoder 23a such that the control lines SDACK00 to SDACK70 of the DMAC 6 are connected to the control line DACK20 of the slot $7_1$ through the gate circuit $29_1$. In this embodiment, the 12 slots $7_1$ to $7_{12}$ are set, and the decoder 23a decodes 4 bits and outputs the decoded data as 16-bit data. Therefore, only 12 bits are used for the 12 slots, but the remaining 4 bits are not connected. Similarly, only 12 bits are used in each of the decoders 23b to 23d and 24a to 24d. An output signal from the decoder 24a, based on the lower 4 bits D7 to D4, is input to the gate circuits $25_{13a}$ to $25_{24b}$ (not shown). The gate circuits $25_{13a}$ to $25_{24b}$ operate in accordance with the output signal from the decoder 24a such that the control line DREQ21 of each of the slots $7_1$ to $7_{12}$ is connected to the control line SDREQ11 of the DMAC 6 through the gate circuit $28_2$. The output signal from the decoder 24a is also input to the gate circuits $26_{13a}$ to $26_{24b}$ (not shown). The gate circuits $26_{13a}$ to $26_{24b}$ operate in accordance with the output signal from the decoder 24a such that the control lines SDACK00 to SDACK70 of the DMAC 6 are connected to the control line DACK20 of the slot $7_2$ through the gate circuit $29_2$. Note that the output signals from the decoders 23a and 24a are determined by the 8-bit data D01 to D71 and can be input, as independent DMA transfer control signals, to the DMAC 6.

Figure 5B:
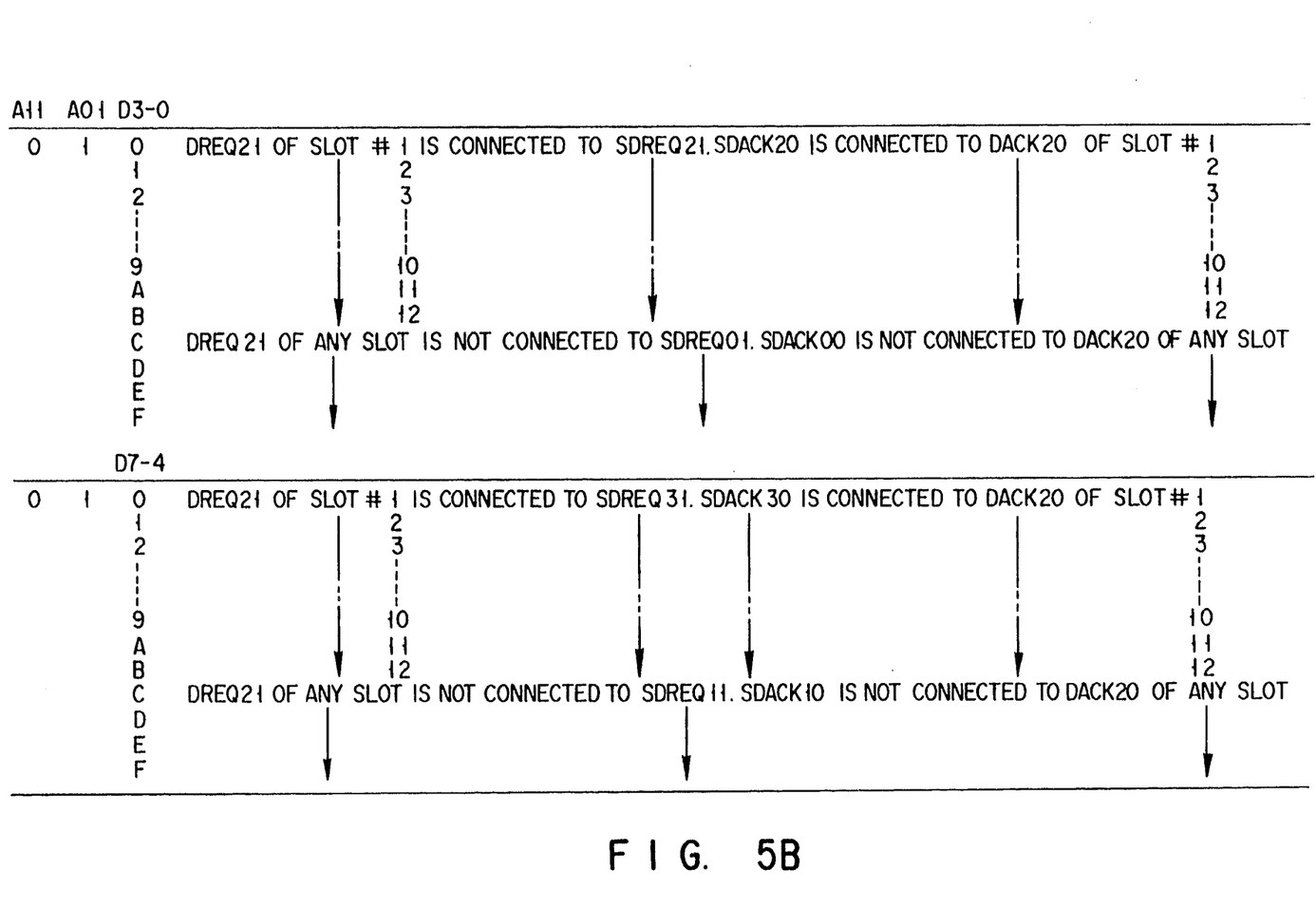

Then, as also shown in FIG. 5B, if the switching designation signals A11 and A01 are respectively set at "0" and "1", the register 22b is selected. Consequently, the control line SDREQ21 is connected to the DMAC 6 in place of the control line SDREQ01; the control line SDREQ31, in place of the control line SDREQ11; the control line SDACK20, in place of the control line SDACK00; and the control line SDACK30, in place of the control line SDACK10.

Figure 5C:
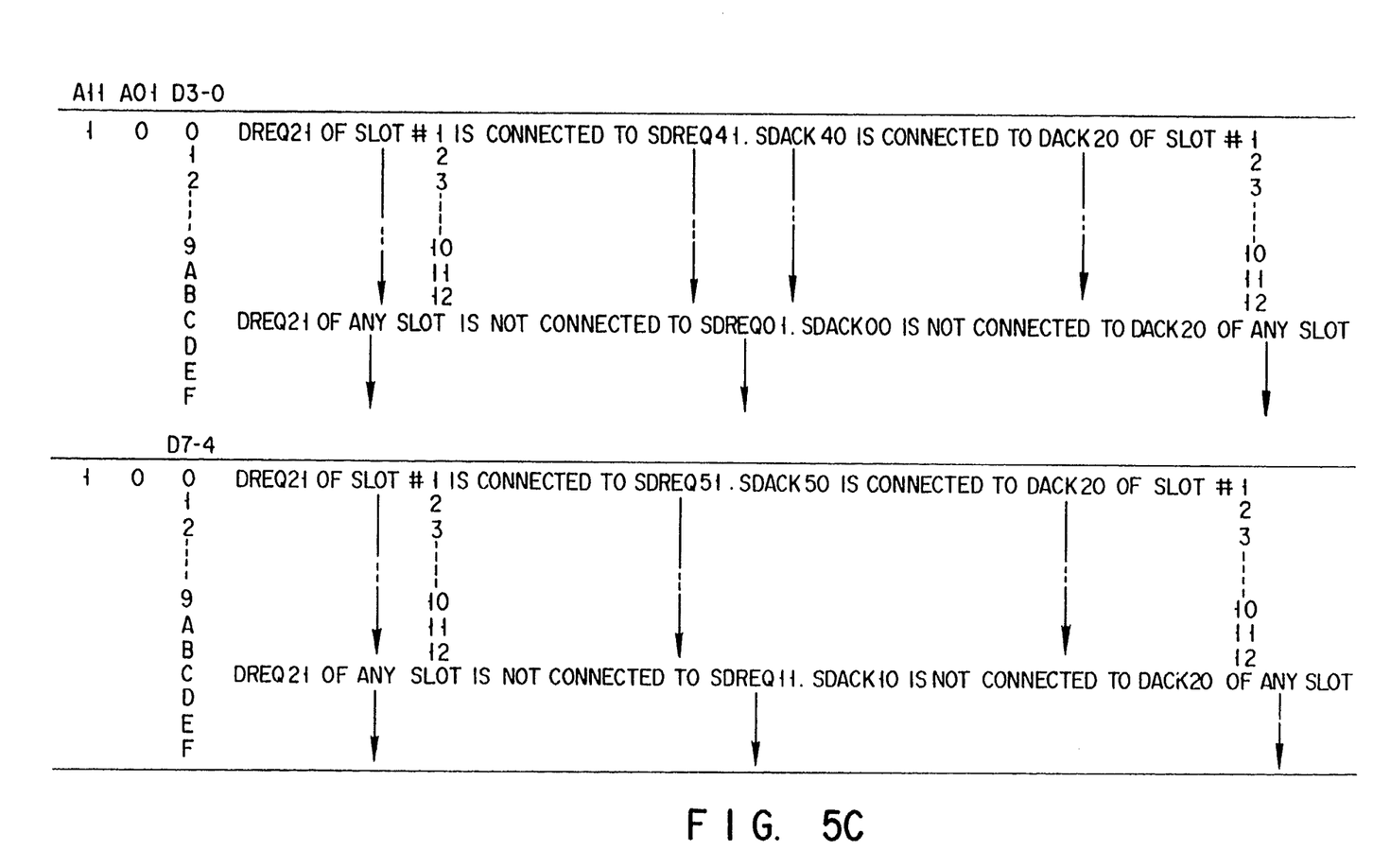

As shown in FIG. 5C, if the switching designation signals A11 and A01 are respectively set at "1" and "0", the register 22c is selected. Consequently, the control line SDREQ41 is connected to the DMAC 6 in place of the control line SDREQ01; the control line SDREQ51, in place of the control line SDREQ11; the control line SDACK40, in place of the controlline SDACK00; and the control line SDACK50, in place of the control line SDACK10.

Figure 5D:
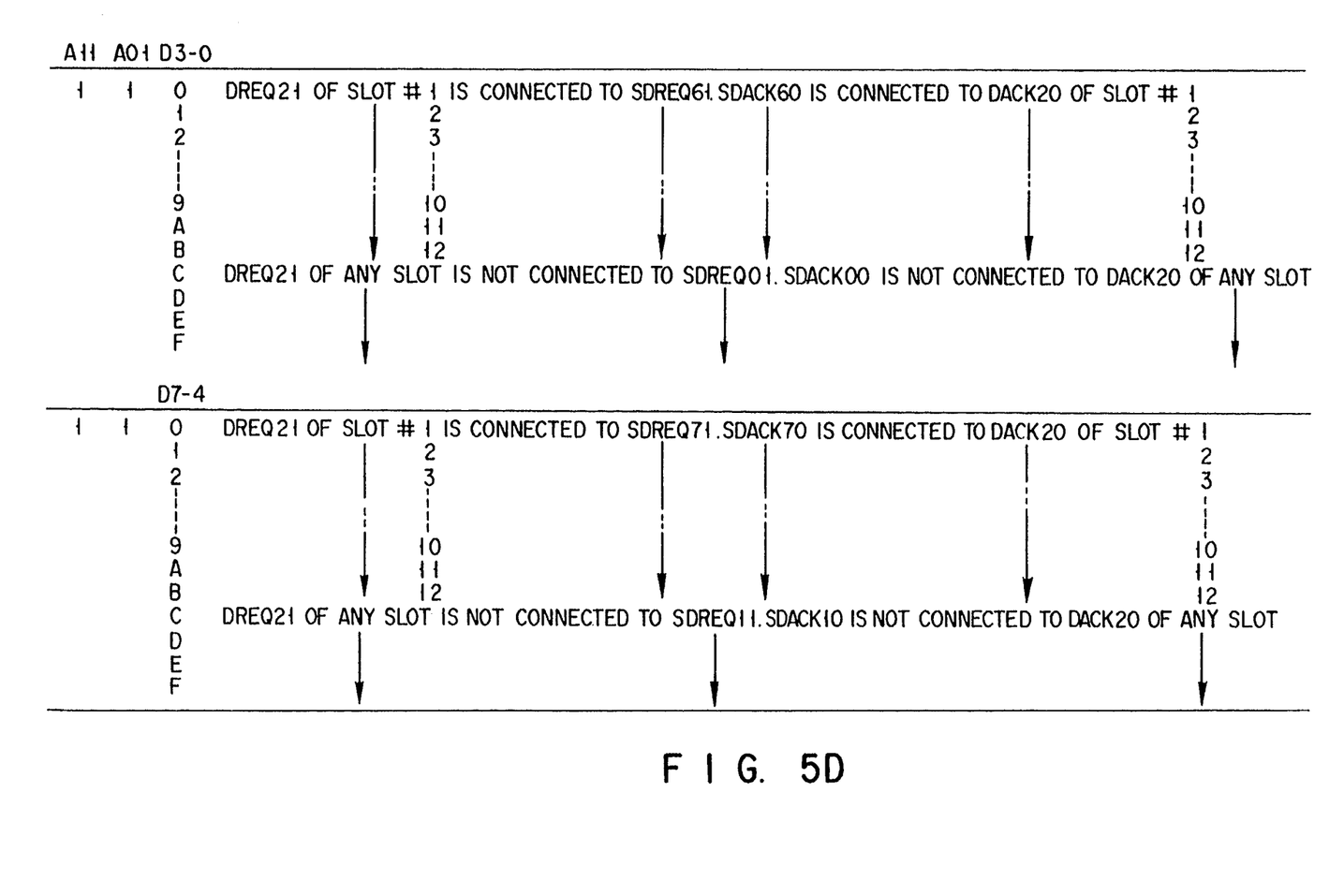

In addition, as also shown in FIG. 5D, if both the switching designation signals A11 and A01 are set at "1", the register 22d is selected. Consequently, the control line SDREQ61 is connected to the DMAC 6 in place of the control line SDREQ01; the control line SDREQ71, in place of the control line SDREQ11; the control line SDACK60, in place of the control line SDACK00; and the control line SDACK70, in place of the control line SDACK10.

Referring to FIG. 1, the DMACs 5 and 6 are respectively arranged as a master and a slave. However, the DMACs 5 and 6 may be independently connected to the CPU 1. In addition, according to the arrangement shown in FIG. 3, since the registers 22a to 22d are collectively set, even a partial change in the setting demands a total change. If, however, variables are prepared in a memory (not shown), and contents to be set in the registers 22a to 22d are stored in advance, a change in the setting can be made by referring to only the contents of a portion to be changed. Furthermore, the address designation can be changed such that one flip-flop is changed per address. Moreover, the contents of each register can be read out in response to a command from the CPU.

As has been described above, according to this embodiment, independent control lines can be newly set in units of slots while the compatibility of the slots with the existing information processing apparatuses is maintained. As a result, the number of control lines can be increased, and an expanded function unique to each slot can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A DMA channel control apparatus comprising:
   a plurality of expansion slots;
   common DMA transfer means commonly connected to said plurality of expansion slots;
   DNA transfer control means independently connected to each of said expansion slots;
   channel control means, connected to said common DMA transfer means and said DMA transfer control means independently connected to each of said expansion slots, for determining common DMA transfer or independent DMA transfer for each of said expansion slots; and
   a CPU, connected to said channel control means, for outputting commands to said channel control means.

2. An apparatus according to claim 1, wherein said channel control means comprises:
   a DMA channel selector for alternatively performing the logical OR operation of each of DMA transfer control signals input from said expansion slots and a selection signal in accordance with a command from said CPU so as to output a DMA transfer control signal common to said plurality of expansion slots and output an independent DMA transfer control signal for each of said expansion slots;
   a first DMA transfer controller for performing DMA transfer in accordance with the common DMA transfer control signal; and
   a second DMA transfer controller having a plurality of channels for performing DMA transfer in accordance with the independent DMA transfer control signal.

3. An apparatus according to claim 2, wherein said DMA channel selector comprises:
   a first decoder for decoding a DMA transfer switching designation signal from said CPU to output a selection signal for commanding to connect an independent DMA transfer control signal for each of said plurality of expansion slots to one of the plurality of channels of said second DMA transfer controller;
   a plurality of first gate circuits for generating clock signals in response to a predetermined input signal when selected by a selection signal from said first decoder;
   a plurality of registers, respectively arranged in correspondence with said plurality of first gate circuits, for fetching external data in synchronism with the clock signals;
   a plurality of second decoders, respectively arranged in correspondence with said plurality of registers, for performing bit conversion of output signals from said registers;
   a plurality of second gate circuits for connecting an independent DMA transfer control line for a predetermined expansion slot of said plurality of expansion slots, to one of the plurality of channels of said second DMA transfer controller in response to outputs from said plurality of second decoders; and a plurality of third gate circuits for connecting a response signal line for the plurality of channels of said second DMA transfer controller to a response signal line for each of said plurality of expansion slots in response to outputs from said plurality of second decoders.

4. An apparatus according to claim 3, further comprising a reset generator for simultaneously sending a reset signal to said CPU and said plurality of registers, causing said DMA channel selector to perform the logical OR operation of signals from independent DMA transfer control lines of said plurality of expansion slots, and causing said independent DMA transfer control lines to connect to said first DMA transfer controller.

* * * * *